United States Patent [19]

Park

[11] Patent Number: 5,734,548
[45] Date of Patent: Mar. 31, 1998

[54] PORTABLE COMPUTER HAVING A SEPARABLE KEYBOARD WHICH MOVES IN RESPONSE TO MOVEMENT OF A DISPLAY UNIT

[75] Inventor: Yong-Hwan Park, Suwon, Rep. of Korea

[73] Assignee: SamSung Electronics Co., Ltd., Suwon, Rep. of Korea

[21] Appl. No.: 683,688

[22] Filed: Jul. 18, 1996

[30] Foreign Application Priority Data

Jul. 18, 1995 [KR] Rep. of Korea ............... 17540/1995

[51] Int. Cl.$^6$ .................. G06F 1/16; B41J 11/56; H05K 5/02
[52] U.S. Cl. ............................ 361/680; 400/682
[58] Field of Search .............. 364/708.1; 345/168, 345/169, 905; 361/680; 400/82, 489, 682, 691; 341/22

[56] References Cited

U.S. PATENT DOCUMENTS

| | | | |
|---|---|---|---|
| 5,156,475 | 10/1992 | Zilberman | 400/489 X |
| 5,267,127 | 11/1993 | Pollitt | 361/680 |
| 5,318,367 | 6/1994 | Braun et al. | 400/82 |
| 5,336,001 | 8/1994 | Lichtenberg | 400/489 |
| 5,424,728 | 6/1995 | Goldstein | 341/22 |
| 5,454,652 | 10/1995 | Huellemeier et al. | 400/489 |
| 5,490,037 | 2/1996 | Clancy | 361/680 |
| 5,532,904 | 7/1996 | Sellers | 361/680 |
| 5,543,787 | 8/1996 | Karidis et al. | 361/680 X |
| 5,596,480 | 1/1997 | Manser et al. | 361/680 |
| 5,612,691 | 3/1997 | Murmann et al. | 341/22 |
| 5,613,786 | 3/1997 | Howell et al. | 400/489 |
| 5,615,081 | 3/1997 | Ma | 361/680 |

*Primary Examiner*—Michael W. Phillips
*Attorney, Agent, or Firm*—Robert E. Bushnell, Esq.

[57] ABSTRACT

Disclosed is a portable computer having a separable keyboard which includes a base housing, a keyboard spread over the base housing, and a lid that can be folded over the base housing. The keyboard is separated into two sections and a corner of each keyboard section is hinged with the base housing. By a keyboard spring, the two keyboard sections are biased to be rotated together. After the opening of the lid, a user may manually rotate the keyboard halves apart to one of several discrete angles. When the user is finished working on the computer, the user may close the lid. As the user closes the lid, the separated keyboard halves are automatically rejoined without any additional effort by the user. In the corners of the keyboard sections, opposite to the right and left of the corner in which the hinge portion is formed, are formed a plurality of lever grooves which allow the keyboard sections to be maintained in a spread-apart state. In the upper part of the base housing, levers are formed that catch the lever grooves. When the user has completed working on the computer, the lid is closed, causing the levers become removed from the grooves, releasing the keyboard sections from their spread-apart states, and allowing the keyboard sections to rotate back together to a closed position.

21 Claims, 4 Drawing Sheets

PORTABLE COMPUTER HAVING A SEPARABLE KEYBOARD WHICH MOVES IN RESPONSE TO MOVEMENT OF A DISPLAY UNIT

CROSS REFERENCE TO RELATED APPLICATION

This application makes reference to, incorporates the same herein, and claims all benefits accruing under 35 U.S.C. §119 from an application for a *Portable Computer Having A Separable Keyboard* earlier filed in the Korean Industrial Property Office on 18 Jul. 1995 and there duly assigned Ser. No. 17540/1995.

FIELD OF THE INVENTION

The present invention relates to a portable computer having a keyboard that separates for ergonomic reasons. More specifically, this invention is about a keyboard that can separate apart and move back together again automatically in response to the opening and closing of the lid.

BACKGROUND OF THE INVENTION

There has been increasing interest in adapting keyboards used with desk-top computers to the particular anatomical needs of the human body. There is, in fact, a trend toward designing the key arrangement on keyboards so that use of a computer, even for long periods, does not over strain the body, and specifically, the wrists. For example, it is now known that if the right and left sides of the keyboard are slightly spread, strain to the wrists can be eliminated, even after extended periods of computer use. For example, U.S. Pat. No. 5,336,001 for a *Maximum Comfort Keyboard* to Lichtenberg discloses an ergonomically adjustable keyboard. Among the adjustments is the ability to pivotally rotate both halves of the keyboard away from each other at an angle desired by an individual user. This embodiment is discussed in column 8, lines 43–59.

U.S. Pat. No. 5,424,728 for a *Keyboard* to Goldstein discloses a keyboard that, among other things, can pivotally rotate apart at an angle desired by the user. A ball and socket type hinge is used to control the angle of separation between the two halves of the keyboard. Goldstein's invention is directed towards keyboards used in computer terminals.

U.S. Pat. No. 5,318,367 for a *Pivotable Keyboard Arrangement* to Braun et al. discloses a keyboard for typewriters and for computer terminals that, among other features, can be pivotally separated. Column 3, lines 44–65 disclose how the two halves of the keyboard can be rotated apart at an angle as desired by the user.

Finally, U.S. Pat. No. 5,454,652 for an *Adjustable Keyboard* to Huellemeier et at. discloses a keyboard that pivots apart. The keyboard is divided into two halves. Each half is monolithically attached to a pivot in the rear center corner. The rear, exterior corner of each half rotates backwards. As there are an infinite amount of angles possible, the keyboard halves are not restricted to opening to a predetermined angle. To rotate the keyboards apart, the user twists a lever. Huellemeier et al '652 is not limited to notebook or portable computers.

New designs in the prior art of portable computers allow the keyboard to spread to get the beneficial effects of reducing strain on the wrists. For example, U.S. Pat. No. 5,502,460 for an *Ergonomic Laptop Computer and Ergonomic Keyboard* to Bowen which describes a slidably separable keyboard for a laptop computer. Several embodiments are disclosed. One embodiment slidably separates the keyboard, another embodiment folds the keyboard open or closed.

However, the spreading and closing operation of a keyboard is cumbersome, and there is therefore a need for a keyboard that automatically rotates in response to the pivoting of the lid about the base housing. U.S. Pat. No. 5,490,037 for a *Flexing Keyboard Structure for a Notebook Computer* to Clancy discloses a keyboard for a notebook computer that flexes automatically when the lid is opened and automatically flexes back to a flat topography when the lid is closed. The keyboard flexes to better accommodate the fingers of a user. Since this ergonomic feature is tied to the opening and the closing of the lid, a step is saved by the user in that the user does not have to adjust the keyboard once the lid is opened. What I have found to be needed is a notebook computer where both keyboard halves rotate in response to the pivoting of the lid onto the base housing.

SUMMARY OF THE INVENTION

The present invention has been made in an effort to fulfil the above need.

It is an object of the present invention to provide a portable computer having a separable keyboard in which the re-merging of the keyboard is automatically accomplished in response to the closing of a lid.

It is also an object of the present invention to provide a portable computer having a separable keyboard in which the keyboard sections may be manually rotated apart to one of several discrete angles after the lid has been opened.

These and other objects may be achieved by providing a portable computer that includes a base housing, a keyboard spread over the base housing, and a lid that can be folded over the base housing. The keyboard is separated into two sections and a corner of each keyboard section is connected to a hinge which is connected to the base housing. A keyboard spring biases the two keyboard sections together into juxtaposition, and the keyboard sections may be manually spread apart by a user once the lid is opened. A plurality of lever grooves are formed to allow the keyboard sections to be maintained in a spread-apart state despite the keyboard bias spring. Levers, attached to the base housing, engage the lever grooves, maintaining the keyboard sections in a separated state. When the user is finished working on the notebook computer, the user closes the lid, which results in releasing the levers from the lever grooves, causing the keyboard sections to rotate back into juxtaposition automatically.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
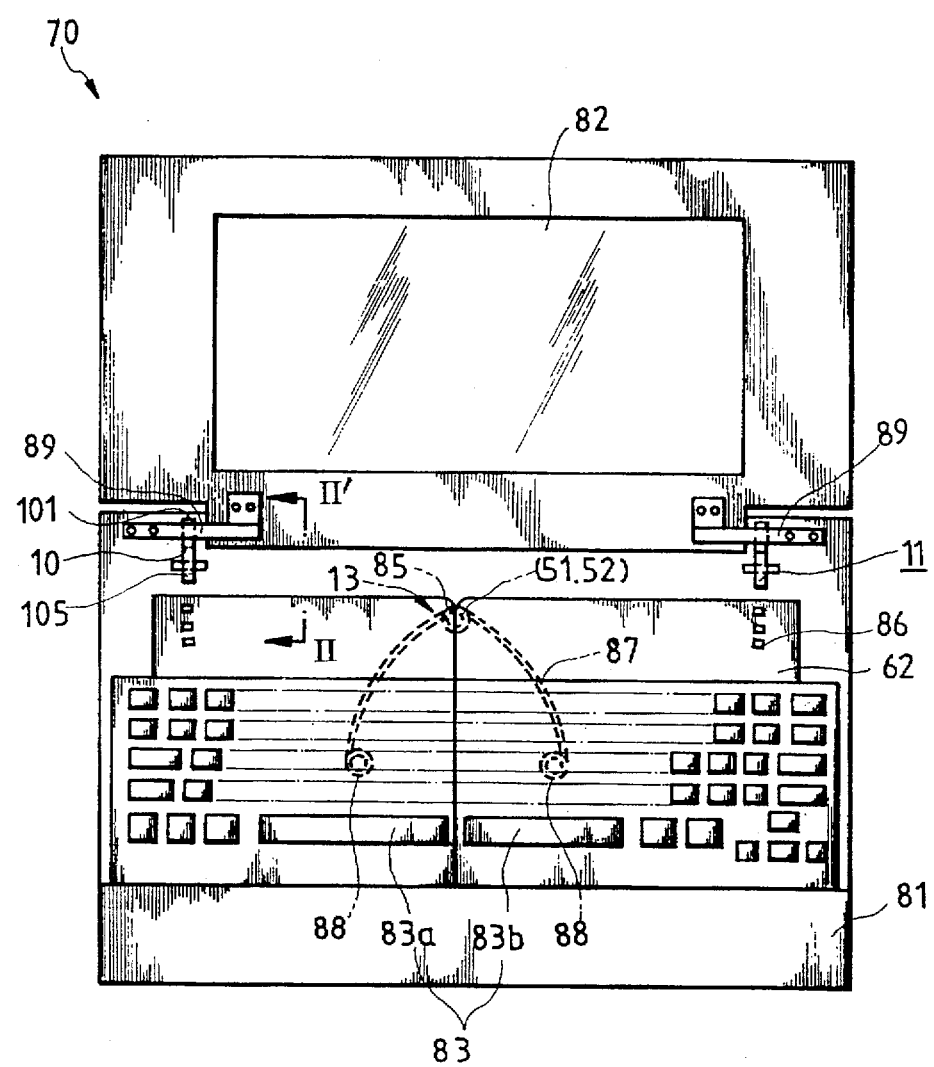
FIG. 1 is a view showing a portable computer having a separable keyboard in accordance with a preferred embodiment of the present invention, and in this drawing, two sections of a keyboard are shown in a merged state.
Figure 2:
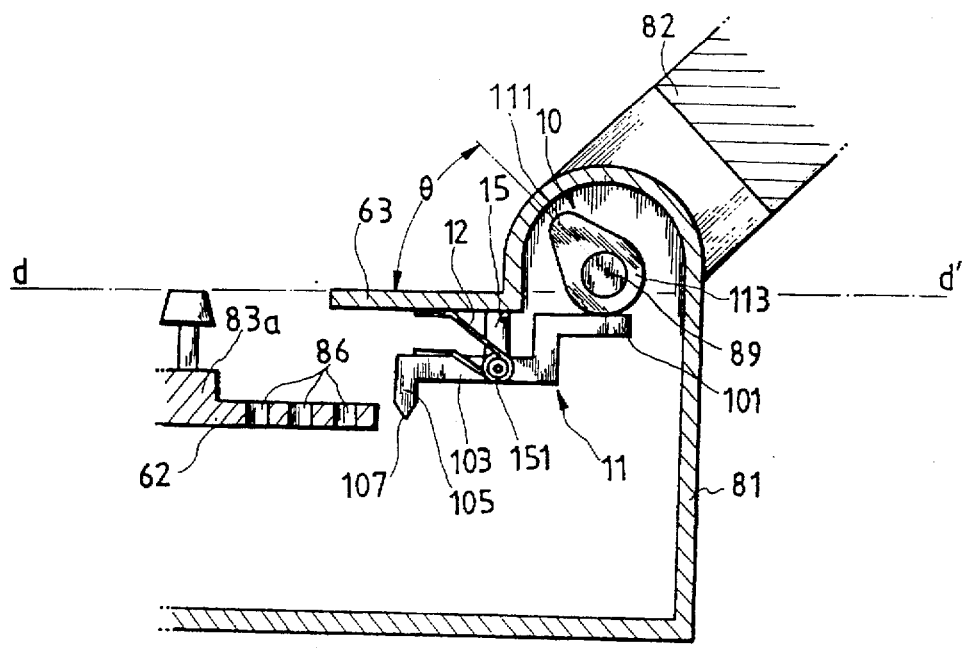
FIG. 2 is an enlarged cross-sectional view of a hinge link between a base housing and a lid taken along line II-II' of FIG. 1 where the lid is in an open state and the keyboard sections are in juxtaposition.

Preferred embodiments of the present invention will now be described in detail with reference to the accompanying drawings. In FIGS. 1 and 2, reference numeral 81 indicates a base housing, reference numeral 82 indicates a lid, and reference numeral 83 refers to a keyboard of notebook computer 70. Base housing 81 typically houses a disk drive, a power supply, a microprocessor, memory, and sometimes a modem. Lid 82 generally contains a display unit on the underside that becomes visible to the user when lid 82 is rotated open from base housing 81. Keyboard 83, the structure of the union between keyboard 83 and base housing 81, and the link structure between base housing 81 and lid 82 of notebook computer 70 having a separable keyboard feature according to a preferred embodiment of the present invention will first be explained.

As illustrated in FIG. 1, keyboard 83 is divided into two keyboard sections 83a and 83b. Hinge portion 13 includes hinge axis 85, mounted on rear ledge 62 of base housing 81 between left keyboard section 83a and right keyboard section 83b. Hinge axis 85 is inserted through holes 51 and 52 in left keyboard section 83a and right keyboard section 83b respectively, keeping left keyboard section 83a and right keyboard section 83b rotatably attached to base housing 81 of notebook computer 70. Keyboard sections 83a and 83b are perforated by lever grooves 86 (three shown on each side) that are placed in such a way as to correspond to the circumference of a circle made with hinge axis 85 as its center. Lever grooves 86 are placed on rear ledge 62 opposite holes 51 and 52 of keyboard sections 83a and 83b respectively.

On the underside of each of keyboard sections 83a and 83b, keyboard spring fixing parts 88 are formed which fix each end of keyboard spring 87. Keyboard spring 87, bent roughly into a V-shape, is centered on hinge axis 85 of base housing 81. Thus, keyboard spring 87 serves to both bias both keyboard sections 83a and 83b together into juxtaposition and to attach the keyboard sections 83a and 83b to base housing 81.

A means to maintain separation between keyboard sections 83a and 83b will now be explained with reference to FIG. 2. The merging structure of base housing 81 and lid 82 includes lid hinge axes 89, which are fixed to both sides of the bottom part of lid 82. The lid hinge axes 89 each include lever 11, fixed on both corners of base housing 81, and an oval cam 10, fixed to and moving together with lid hinge axis 89. Hinge axis 89 rotates oval cam 10 which causes lever 11 to rotate which causes lever 11 to disengage lever groove 86 of keyboard section 83a or 83b.

Levers 11 are fixed in hinge brackets 15, which extend downward from both sides of base housing 81, and are able to pivot on hinge pins 151. Oval cams 10 are formed, each having a lobe or large diameter portion 111 and small diameter portion 113. Levers 11 each include first distal portion 101, which cams with lobe 111 of rotating oval cam 10, pivot portion 103, through which hinge pin 151 passes through, and second distal portion 105, having pointed portion 107 which are inserted into lever grooves 86 when keyboard sections 83a and 83b are separated. Lever springs 12 are compressed between lever ledges 63 of base housing 81 and second distal portion 105 of rotatable levers 11 causing levers 11 to be biased so as to engage grooves 86 of keyboard 83. Second distal portions 105, responding to the camming action of lever grooves 86 on pointed portions 107, can easily be pushed against the bias of lever springs 12 when keyboard sections 83a and 83b are separated.

Figure 3:
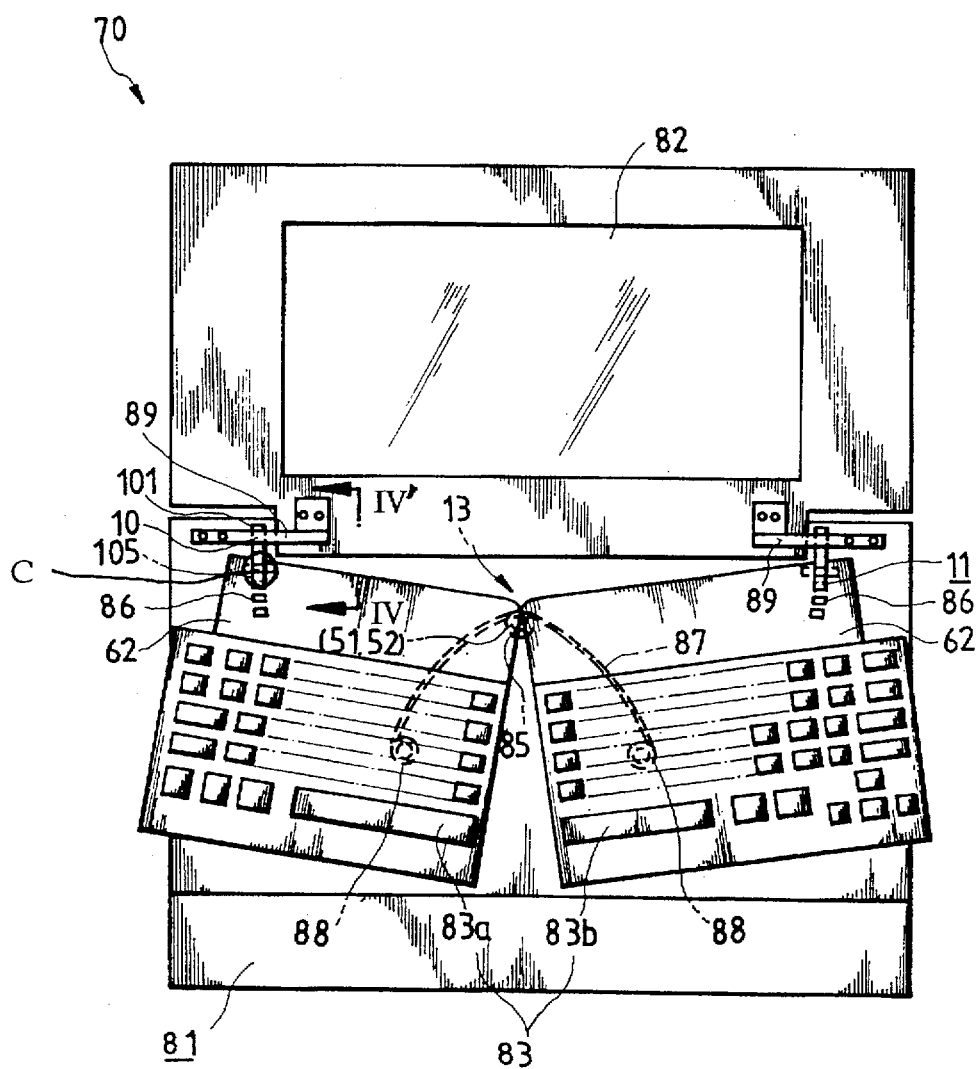
FIG. 3 illustrates a portable computer having a separable keyboard in accordance with a preferred embodiment of the present invention, and in this drawing, two sections of a keyboard are in a separated state.
Figure 6:
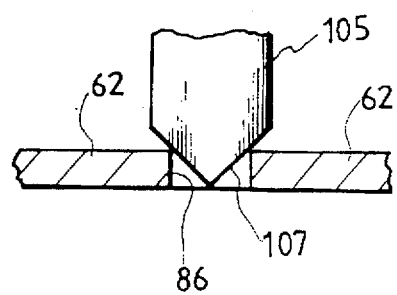
FIG. 6 is an enlarged view of C in FIG. 4 showing the lever catch portion retained in a lever groove preventing a keyboard section from rotating closed.

The following describes the separation operation of the present invention in accordance with a preferred embodiment with reference to FIGS. 1–4. First, FIG. 1 shows the present invention in a state where lid 82 is opened from base housing 81. In this state, if the user manually spreads keyboard sections 83a and 83b apart and to a desired angle against the tension of keyboard spring 87, keyboard sections 83a and 83b can be maintained in a separated state as pointed portions 107 of lever 11 engage with lever grooves 86 in rear ledge 62 of base housing 81. As this is done, lever 11 rotate on pivot pins 151 and, as is shown in FIG. 2, rotate in a clockwise direction against the pressure of lever springs 12. Next, if the user continues to adds more pressure and continues to rotatably separate keyboard sections 83a and 83b away from each other, pointed portions 107 of second distal portions 105 of levers 11 are eventually moved to and inserted into another lever groove 86 formed in rear ledge 62 of keyboard sections 83a and 83b. The spread-apart state of keyboard sections 83a and 83b is shown in FIG. 3. A detailed view of the lever mechanism in the spread-apart state can be seen in FIGS. 4 and 6.

When choosing how far to rotate keyboard sections 83a and 83b, the user can choose which lever groove 86 that is most comfortable for him or her. Because of the elasticity of lever springs 12 and because of the angle of pointed portions 107 of lever 11, another lever groove 86 can be chosen by moving each of keyboard sections 83a and 83b to the desired position. Pointed portion 107 of lever 11 can easily slide out of one groove and into another in response to the manual force applied by the user in spreading the keyboard sections apart.

Figure 4:
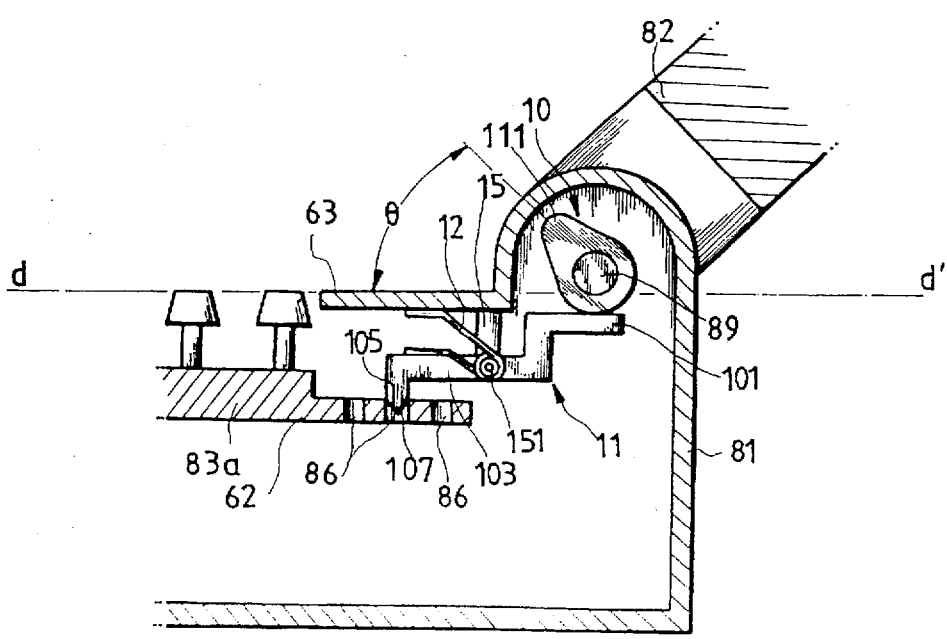
FIG. 4 looking in the direction of IV-IV' is an enlarged cross-sectional view of a hinge link between a base housing and a lid taken along line IV-IV' of FIG. 3 where the lid is in an open position and the two keyboard sections are maintained spread apart from each other.
Figure 5:
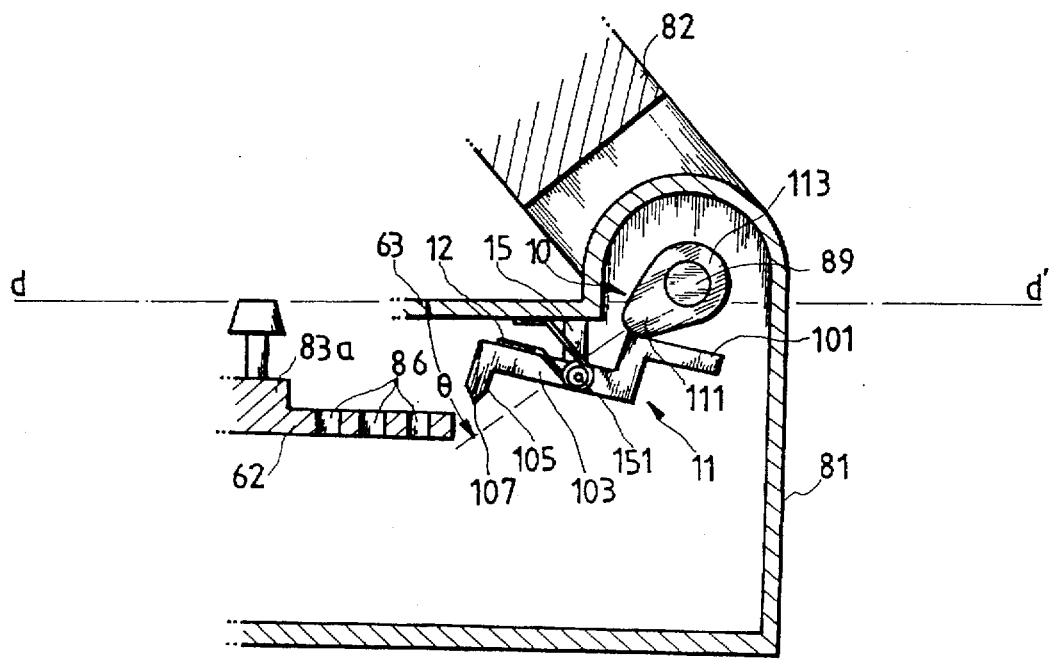
FIG. 5 is an enlarged sectional view of a hinge link between a base housing and a lid when the lid is being folded over the base housing and the keyboard sections are being released from a separated state and allowed to return to a juxtaposition.

The following describes the process of folding lid 82 after work on the notebook computer 70 is finished. In the present invention, keyboard sections 83a and 83b, which are manually spread apart by the user, can also be manually closed. However, for the convenience of the user, keyboard sections 83a and 83b can also be closed automatically by simply folding lid 82 onto base housing 81. To accomplish this, cams 10 are attached to hinge axis 89. As lid 82 rotates with respect to base housing 81, cams 10 also rotate with respect to base housing 81. As shown in FIGS. 2, 4, and 5, plane dd' defines defines the plane formed by base housing 81. Angle theta defines the angle between plane dd' and a line extending through the lobe 111 of oval cam 10 and the rotational axis of oval cam 10. When lid 82 is in an open position, angle theta lies above plane dd', as is shown in FIGS. 2 & 4. As lid 82 is folded over base housing 81, angle theta decreases to zero and then becomes negative, as lobe 111 of oval cam 10 extends below plane dd', as shown in FIG. 5. When angle theta extends beneath plane dd', lobe 111 of oval cam 10 cams with first distal portion 101 of lever 11, causing lever 11 to rotate about pivot 151 and causing second distal portion 105 to rotate upwards, causing pointed portion 107 of second distal portion 105 of lever 11 to lift out of groove 86 in rear ledge 62 of left keyboard section 83a, releasing left keyboard section 83a from its separated state and allowing it to return automatically to a juxtaposition with keyboard section 83b because of the bias of spring 87. The same process occurs simultaneously for on the right side of notebook computer 70 with right keyboard section 83b. Thus, keyboard sections 83a and 83b automatically return from their separated state to a juxtaposition in response to folding lid 82 on to base housing 81.

If the keyboard structure of the present invention is applied to portable computers, the keyboard sections can be placed at an angle suitable for the user and, by being able to do so, the wrists are not overstrained even after operating the computer for an extended period of time. In addition, after finishing work on the computer, by merely folding the lid over the base housing, the keyboard sections can be automatically merged.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A portable computer, comprising:

a base housing a central processing unit, said base having a top side, a bottom side, and opposed front edge and rear edge;

a lid containing a display unit mounted on the underside of said lid and driven by said central processing unit to provide variable visual video displays, said lid rotatably attached to hinges located on said top side along said rear edge of said base housing;

a keyboard disposed on said top side of said base housing, said keyboard separable into two keyboard sections that are displaced from each other;

means for biasing said two keyboard sections to a juxtaposition;

means for restraining said two keyboard sections from moving together in juxtapose; and means for overcoming said means for restraining said two keyboard sections from moving together in juxtapose in response to rotating said lid onto said base housing.

2. The portable computer of claim 1, wherein said two keyboard sections separate from each other by rotating apart from each other.

3. The portable computer of claim 2, wherein said two keyboard sections are both connected to a single pivot.

4. The portable computer of claim 3, wherein said pivot is disposed on said top side of said base between said two keyboard sections and said rear side of said base.

5. The portable computer of claim 3, wherein said biasing means is comprised of an elastic strip affixed to said pivot.

6. The portable computer of claim 5, where said elastic strip attaches said two keyboard sections to said top side of said base.

7. The portable computer of claim 3, wherein said means for restraining said two keyboard sections from moving together in juxtapose and said means for overcoming said means for restraining said two keyboard sections from joining together in juxtapose, comprises:

cams, affixed to and rotating with said hinges on said top side near said rear edge of said base housing;

levers, rotatably attached to said base housing and able to pivot in response to rotation of said cams upon said opening and said closing of said lid; and lever grooves perforating each of said two keyboard sections for catching and releasing said levers, restraining said two keyboard sections from joining together in juxtapose when said lid is opened from said base housing and when said two keyboard sections have been manually spread apart, and for overcoming said means for restraining said two keyboard sections form joining together in juxtapose when said lid is rotated onto said base housing.

8. The portable computer of claim 7, wherein each one of said levers are pivotally attached, by pivot pins to said rear edge of said base.

9. The portable computer of claim 8, wherein each of said levers further comprise:

a first distal portion for camming with said cams affixed to said hinges;

a pivot portion, through which said pivot pins pass, rotatably attaching said lever to said base; and a second distal portion having tips for engaging one of said lever grooves when said two keyboard sections are manually separated.

10. The portable computer of claim 9, wherein compressed lever springs are inserted between said levers and said base housing for biasing said second distal portion of said levers to engage one of said lever grooves.

11. The portable computer of claim 9, wherein each of said two keyboard sections are perforated by at least three lever grooves for maintaining said two keyboard sections at a discrete angle and for preventing said two keyboard sections from joining together.

12. The portable computer of claim 9, wherein said tips of said second distal portion of said levers are pointed to allow for said levers to be easily lifted upward and out of said lever grooves when said two keyboard sections are manually adjusted.

13. A method of using a portable computer having a spreadable keyboard, said method comprising the steps of:

manually opening a display unit at a predetermined angle;

spreading said keyboard to one of a plurality of discrete angularly different positions; and returning said keyboard from said one of said plurality of discrete positions to an unspread position by releasing a spring bias while folding said display unit closed onto said keyboard.

14. The method of claim 13, further comprised of automatically returning said keyboard from said one of said plurality of discrete positions by folding said display unit closed onto said keyboard.

15. The process of using a notebook computer, comprising:

exposing a display unit mounted on the underside of a lid and driven by a central processing unit to provide variable visual video displays, and exposing two rotatably separable sections of a keyboard lying in juxtaposition upon a base by opening said lid from a coplanar positional relation against said base housing said central processing unit;

manually rotating apart said two rotatably separable sections of said keyboard from said juxtaposition to a desired angle;

performing work on said notebook computer by manually depressing a plurality of keys borne by said keyboard; and automatically and simultaneously returning said two rotatably separable sections of said keyboard to said juxtaposition by closing said lid onto said base.

16. A portable computer, comprising:

a base housing a central processing unit, said base having a top side, a bottom side, and opposing from and rear sides;

a lid containing a display unit mounted on the underside of said lid and driven by said central processing unit to provide variable visual video displays, said lid being pivotally attached to said rear side of said base;

two rotatably separable sections of a keyboard disposed on said top side of said base deployable into a plurality of positions mutually angularly displaced from juxtaposition; and linkage means driven by rotation of said lid relative to said base to release said two separable sections of said keyboard restoring said juxtaposition simultaneous to the closing of said lid onto said base.

17. The portable computer of claim 16, wherein said two rotatably separable sections of said keyboard separate from each other about a single pivot.

18. The portable computer of claim 17, wherein said pivot is disposed between said said keyboard and said rear side of said base.

19. A portable computer, comprising:

a base housing a central processing unit, said base having a top side, bottom side, front side, and a rear side, said rear side opposite to said top side;

a lid containing a display unit mounted on the underside of said lid and driven by said central processing unit to provide variable visual video displays, said lid having a top side and a bottom side, said lid is pivotally attached to said rear side of said base housing, said bottom side of said lid folds onto said top side of said base housing when said lid is pivoted to a closed position, and said lid opens up from said base housing exposing a display unit on said bottom side of said lid when said lid is pivoted to an open position;

a separable keyboard disposed on said top side of said base housing, said separable keyboard is comprised of two separable keyboard sections; and linkage means interconnecting said lid to said separable keyboard on said base housing, said linkage means releasing said two separable keyboard sections into juxtaposition in response to pivoting said lid to said closed position.

20. The portable computer of claim 19, wherein each of said two separable keyboard sections are connected to a keyboard pivot allowing a user to manually rotate said two separable keyboard sections apart after said lid is pivoted to said open position.

21. The portable computer of claim 20, wherein said keyboard pivot is located between said two separable keyboard sections and said rear side of said base.

* * * * *